Sept. 14, 1965     L. D. LIVELY ETAL     3,205,700
APPARATUS FOR RECOVERING MINUTE QUANTITIES
OF VOLATILE COMPOUNDS FROM INERT SOLIDS
Filed Feb. 25, 1963

INVENTORS
LAWRENCE D. LIVELY,
CLARK E. JAYNES &
BY   JAMES B. SMITH

ATTORNEY

United States Patent Office 3,205,700
Patented Sept. 14, 1965

3,205,700
APPARATUS FOR RECOVERING MINUTE QUANTITIES OF VOLATILE COMPOUNDS FROM INERT SOLIDS
Lawrence D. Lively, Canonsburg, Pa., and Clark E. Jaynes and James B. Smith, Ponca City, Okla., assignors to Continental Oil Company, Ponca City, Okla., a corporation of Delaware
Filed Feb. 25, 1963, Ser. No. 260,516
8 Claims. (Cl. 73—19)

This invention relates in general to the analysis of inert solid materials, such as well bore cuttings and soil samples, for minute quantities of volatile compounds, such as hydrocarbons, entrapped therein. More particularly, but not by way of limitation, the present invention relates to a method and apparatus for extracting or recovering, in a relatively pure state, microgram quantities of volatile compounds from inert solid materials in which such compounds are entrapped.

For a number of years, considerable interest has been manifested in methods of analysis of soil samples of various types for the purpose of determining the presence of hydrocarbons or other volatile organic compounds in such samples as such presence may be indicative of the location of petroleum or natural gas deposits in the region from which such samples are taken. The methods of analyzing soil samples for such volatile compounds have been many and varied, but predominantly have relied upon techniques which involve heating and/or evacuating the soil samples to drive off the volatile compounds entrapped therein and passing the compounds so liberated through a suitable gas analysis device, such as a hot wire detector, or a gas chromatographic column, etc.

Several shortcomings have generally characterized the methods of solid sample analysis which involve heating or evacuating the sample to extract the so-called "soil gases" or volatile hydrocarbons therefrom. One of the major problems is commingling of these gases with air which is simultaneously removed from the interstices of the sample with the gases to be analyzed, which commingling results in inaccurate analysis, or limitations on the type of analysis of the gases which may be conducted, particularly, analysis by gas chromatographic techniques. Also, extraction by heating or evacuation of the sample generally results in a less uniform release of the volatile compounds from the solid than is optimum for subsequent analytical purposes. This characteristic of previous methods of analysis presents substantial difficulty where volatile compounds are subsequently to be analyzed by gas chromatography, since it is essential in such chromatographic analysis that the gaseous compounds to be analyzed enter the chromatographic column substantially simultaneously.

It is a major object of the present invention to provide an improved method and apparatus for recovering small quantities of volatile compounds from inert solids, such as well core chips, rocks, drilling mud samples and the like.

A more specific object of the invention is to provide a method of recovering microgram quantities of volatile compounds from the interstices of a solid in a relatively air-free state.

Another object of the present invention is to permit the volatile compounds entrapped in porous, inert solid samples to be more effectively analyzed by gas chromatography.

Yet another object of the invention is to improve the uniformity with which a mixture of volatile compounds extracted from an inert solid sample may be introduced to a gas chromatographic column.

A further object of the invention is to extract in the gaseous state from a porous, inert solid material, the volatile compounds entrapped therein, and convey these compounds substantially simultaneously to a gas chromatographic column without permitting any of the compounds to be lost by condensation prior to introduction to the chromatographic column.

The present invention which accomplishes the foregoing objects broadly comprises a method by which the solid sample is initially cooled to a temperature sufficiently low to retain the volatile compounds to be analyzed in the interstices of the solid in either the liquid or the solid state. While the solid sample is maintained at this temperature, a vacuum is applied to the sample to remove the entrapped air therefrom. The sample is then heated to drive off the volatile compounds therefrom, and these compounds are passed in a relatively air-free state into a cold trap where they are condensed and/or solidified in a small, confined volume.

After the volatile compounds have been collected in a single location in the small, confining volume of the cold trap, and again subjected to evacuation at a relatively low pressure to remove any entrained air therefrom, the cold trap vessel is heated to vaporize the volatile compounds, and they are simultaneously swept out of the cold trap by a hot, carrier gas, such as nitrogen or helium. The stream of hot, carrier gas is passed through a thermostatically heated zone immediately before it is passed through the heated cold trap to pick up the vaporized compounds to be analyzed, and is also passed through the same thermostatically heated zone en route to a gas chromatographic column after merging with the volatile compounds. The gas chromatographic column is positioned closely adjacent the thermostatically heated zone so that the volatile materials to be analyzed have no opportunity to condense before entering the column.

The novel apparatus utilized in practicing the invention is contrived to permit virtually all of the volatile compounds extracted from the solid sample to be passed into a chromatographic column or other analytical apparatus in a relatively air-free state with a minimum of physical manipulation by an operator. The apparatus broadly comprises a metallic block which has formed therein at least one sample injection passageway, air evacuation passageways and two additional passageways, one of which is for conducting an inert carrier gas into the block, and the second of which is utilized for discharging the inert carrier gas from the block. Positioned in the block in a position to interconnect the various passageways in a manner hereinafter described are a pair of two-position, four-way rotary valves.

A sample holding chamber is connected to one of the sample injection passageways of the metallic block and functions to contain a sample of solid material, such as bit cuttings or drilling mud, which sample is to be analyzed for entrapped volatile compounds. A cold trap is connected to a second of the sample injection passageways and to one of the air evacuation passageways and projects downwardly from one side of the metallic block. The cold trap may conveniently consist of a loop or coil of tubular material and is used to trap out the volatile compounds prior to merging these compounds with the stream of hot, inert carrier gas. Connected to a second of the air evacuation passageways of the metallic block is a source of vacuum which may be employed to apply a vacuum through the air evacuation passageway, one of the ports of the rotary valves, and through the cold trap to the sample holding chamber to extract air both from the solid sample in the sample holding chamber, and from the volatile compounds which are condensed in the cold trap.

In one position of the rotary valves contained in the metallic block, the cold trap and sample chamber are connected to the source of vacuum so that air may be removed from either the solid sample, or from the volatile compounds contained in the cold trap. In a second position of the rotary valves, the hot, inert carrier gas which is passed into the metallic block may be directed through the cold trap to sweep out the volatile compounds therein, and thence directed through the carrier gas discharge passageway in the block and into a gas chromatographic column which is positioned adjacent the metallic block.

A further important element of the invention is a means for heating the metallic block to a desired predetermined temperature so that the carrier gas flowing through the carrier gas passageways in the block may be retained at any desired heat, and so that the volatile compounds which are swept out of the cold trap by the hot, carrier gas will not condense or solidify prior to their passage into the gas chromatographic column.

In adidtion to the hereinbefore described objects and advantages of the invention, other advantages will become apparent upon reading the following disclosure in conjunction with a perusal of the accompanying drawings which illustrate our invention.

Figure 1:
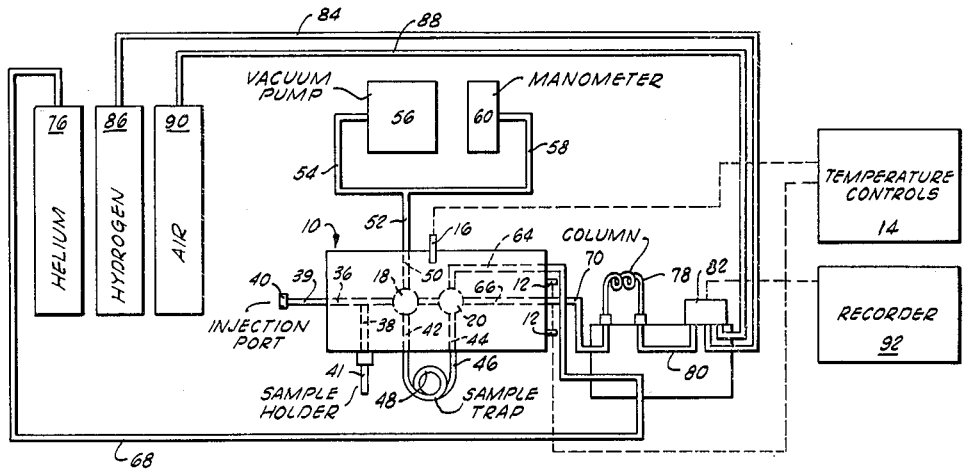
FIGURE 1 is a schematic illustration of one embodiment of the apparatus utilized in practicing the invention.

Referring now to the drawings in detail, and particularly, to FIGURE 1, reference character 10 designates generally a metallic block which, in a preferred embodiment of the invention, is constructed of aluminum, but which may also be constructed of other metals which are relatively good thermal conductors. The metallic block is heated by means of one or more rod-shaped heating elements 12, which elements are in turn connected to suitable temperature control apparatus designated generally by reference character 14. The temperature control apparatus functions to control the degree to which the heating rods 12 are heated in response to a thermostat 16 positioned in the metallic block 10 or other suitable temperature sensing element. Temperature control instrumentation of the described type is well known in the art and constitutes no part of the present invention except insofar as it may be utilized in combination with the heater rods 12 and metallic block 10.

Extending into the metallic block 10 from one side thereof are a pair of generally cylindrical rotary valve members 18 and 20. The generally cylindrical rotary valve members 18 and 20 are provided at their ends outside the metallic block 10 with a pair of handles, 22 and 24 respectively (see FIGURE 4), to facilitate the rotation of the valve members in the operation of the apparatus of the invention. Each of the cylindrical bodies of the rotary valve members 18 and 20 is provided with a pair of arcuate passageways or ports which are designated by reference characters 26 and 28 in the case of rotary valve 18, and 30 and 32 in the case of rotary valve 20. These passageways through the bodies of the two rotary valve members 18 and 20 may be best seen in FIGURES 2 and 3.

In addition to containing bores for the accommodation of the rotary valve members 18 and 20, the metallic block 10 is also provided with a plurality of pasageways which extend from the outer surfaces of the block 10 inwardly to the bores which receive the rotary valve members 18 and 20. One of these passageways, designated generally by reference character 34, is generally T-shaped in configuration and is positioned adjacent the rotary valve 18. The T-shaped passageway 34 is comprised of a horizontally extending passageway 36 and a generally vertically extending passageway 38 which intersects the horizontal passageway 36 approximately midway of its length. The passageway 36 is connected at one of its ends to a tubular injection port conduit 39 and at its other end to the generally cylindrical bore which receives the rotary valve 18. A cap 40 of self-sealing perforable material, such as silicone rubber, closes the open end of the injection port conduit 39. The vertically extending passageway 38 is connected at its lower end to a tubular sample holding chamber 41 which projects downwardly from the metallic block 10 and is utilized in a manner hereinafter explained. For convenience of expression, the passageways 36 and 38 will hereinafter be termed the first and second sample injection passageways, respectively.

A third sample injection passageway 42 extends downwardly from the periphery of the cylindrical bore which receives the rotary valve 18 and terminates at the lower surface of the metallic block 10. Another passageway 44 which will, for convenience of expression, be termed the first air exacuation passageway, extends downwardly from the bore receiving the rotary valve 20 to the lower surface of the metallic block 10. Connected to the third sample injection passageway 42 and the first air evacuation passageway 44 and projecting downwardly below the block 10 is a cold trap 46. The cold trap 46 is preferably constituted by a generally U-shaped tubular member which may have a loop or coil 48 in the lower end thereof.

A second air evacuation passageways 50 extends from the bore receiving the rotary valve 18 to the upper surface of the block 10 and there is connected to a conduit 52. The conduit 52 branches into two conduits with one of its branches 54 being connected to the vacuum pump 56 and the other branch 58 being connected to a manometer.

Two additional passageways are formed in the metallic block 10 and constitute an inert carrier gas inlet passageway 64 and an inert carrier gas discharge passageway 66. These passageways terminate inside the metallic block 10 at the periphery of the bore which receives the rotary valve 20. A pair of conduits 68 and 70 are connected to the passageways 64 and 66, respectively, and are utilized to connect these passageways to a source of an inert carrier gas, and to a gas chromatographic column in an arrangement most easily understood by reference to FIGURE 1.

Figure 4:
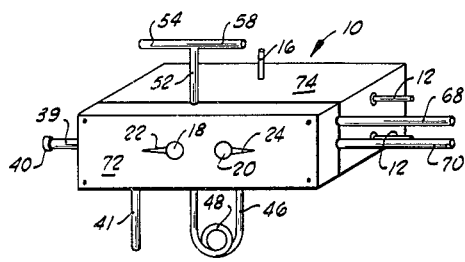
FIGURE 4 is a view in elevation of one type of metallic block which may be utilized in the invention along with its associated sample holding chamber, cold trap and fittings to permit the cold trap and sample holding chamber to be evacuated or connected to a supply of the hot, inert carrier gas.

Before referring to FIGURE 1, however, the reader's attention is invited to FIGURE 4 of the drawings which shows a preferred mode of construction of the metallic block 10 and the associated conduits, sample chamber 41 and cold trap 46. The block is preferably of two-part construction with a face plate 72 secured by screws, rivets or other suitable means to a main body 74 in which are formed the passageways hereinbefore described. This construction facilitates the ease with which the passageways and bores for the accommodation of the rotary valves 18 and 20 may be formed in the block.

The manner in which the thermostatically heated metallic block 10 and its associated appurtenances are connected with other system elements to accomplish the analysis of volatile compounds by gas chromatography is best illustrated in FIGURE 1 of the drawings. A supply 76 of an inert carrier gas, such as helium, is connected through the conduit 68 to the inlet passageway 64 in the metallic block 10. The inert carrier gas which is discharged from the metallic block 10 is passed through the conduit 70 to a gas chromatographic column 78 which is positioned closely adjacent the metallic block 10. The opposite end of the gas chromatographic column 78 is connected through a conduit 80 to a suitable detection device 82 which may be a thermal conductivity cell, or, as shown in FIGURE 1, may be a flame detector of one of the commercially available types well known in the art. Other suitable types of detecting apparatus may also be used and will be well known and understood by those skilled in the art. To produce the flame used in the flame detector 82, hydrogen gas is supplied through conduit 84 from a source 86 and compressed air is supplied through conduit 88 from a source 90. In accordance with technology well understood in the art, the detector 82 is electrically connected to a suitable recording device 92 which registers the quality and quantity of gaseous components sequentially passed into the detector from the gas chromatographic column 78.

*Operation*

Having described the elements of the novel apparatus which make up the system used in practicing the method of the present invention, the way in which such apparatus is used to practice the method will next be discussed. When it is desired to analyze a sample of inert solid material, such as bit cuttings, drilling mud or the like, a small quantity of such sample is placed in the sample holding chamber 41. The sample holding chamber 41, as has previously been explained, is a tubular member which is closed at one of its ends and which is detachably connected at its other end to the passageway 38 in the metallic block 10. When the sample has been placed in the sample holding chamber 41, the chamber is attached to the vertically extending sample injection passageway 38 in the metallic block 10 and the sample holding chamber is immersed in a suitable cooling medium, such as liquid nitrogen. The liquid nitrogen will solidify, or will retain in the liquid state, all of the volatile compounds which may be entrapped in the solid sample, but is not sufficiently cold to prevent air contained in the sample form being extracted therefrom. With the cooling medium positioned around the sample holding chamber 41, the rotary valves 18 and 20 are rotated to the positions shown in FIGURE 2 of the drawings. In this position, the vacuum pump 56 is connected through the cold trap 46 to the sample holding chamber 41, and upon starting the pump, air is evacuated from the solid sample while the volatile compounds of higher boiling points than air entrapped therein are retained in the sample by virtue of the low temperature to which the sample is cooled.

Figure 2:
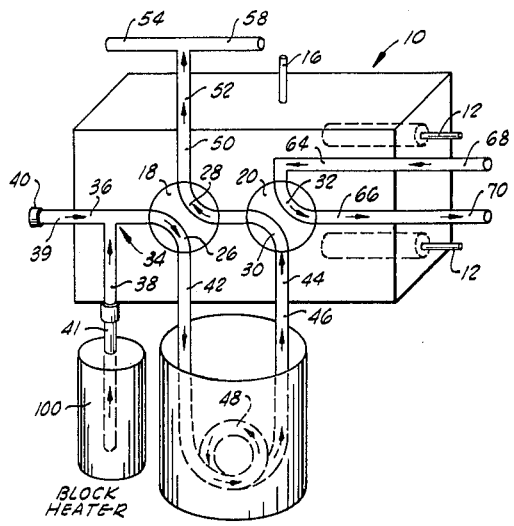
FIGURE 2 is a schematic illustration of the thermostatically heated metallic block which is utilized in the apparatus of the invention showing the initial path of flow of air through the metallic block when the rotary valves contained therein are rotated on one of their two operative positions.

After the vacuum has been applied to the sample for a period sufficient to remove substantially all of the entrapped air therefrom, the cooling medium is removed from around the sample containing chamber 41, and a block heater 100 is placed therearound, as shown in FIGURE 2. Application of the vacuum is continued as the sample is heated to vaporize the volatile compounds contained therein. Two or three minutes prior to the application of heat to the sample chamber 41 by the block heater 100, liquid nitrogen or other suitable coolant is placed around the cold trap 46 so that the apparatus is arranged as shown in FIGURE 2 of the drawings. After the volatile compounds are vaporized and withdrawn from the solid sample by the application of vacuum and heat thereto, the gaseous compounds pass into the cold trap 46 and are there condensed or solidified by the extremely low temperature prevailing therein. When all of the volatile compounds have been trapped out in the relatively small volume represented by the cold trap 46, the application of vacuum through the cold trap is continued for a short period to again extract any air which may be entrained in the sample.

The rotary valve 18 is next rotated to a position to interconnect passageways 42 and 44 and thus make a closed system containing the trapped, liquified volatile sample. The valve 20 is allowed to remain in its FIGURE 2 position. Simultaneously with the shifting of the rotary valve 18 to interconnect passageways 42 and 44, a block heater 102 is positioned around the cold trap 46 and functions to vaporize the volatile compounds which have been previously trapped out therein by the use of the liquid nitrogen coolant. The valve 18 is retained in a position to interconnect passageways 42 and 44 until all of the volatile compounds have been vaporized.

Figure 3:
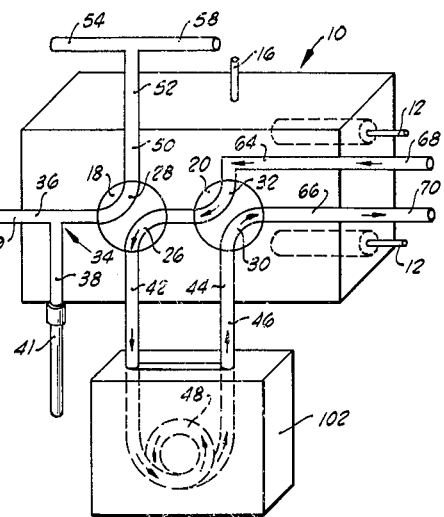
FIGURE 3 is a schematic illustration of the thermostatically heated metallic block utilized in the invention and showing the two-position, four-way rotary valves in a different position from that shown in FIGURE 1 as they are utilized to direct the hot, carrier gas through the cold trap containing the volatile compounds and from the cold trap into a gas chromatography column.

The rotary valves 18 and 20 are next rotated to the positions shown in FIGURE 3 of the drawings. It will be noted that in this position of the valves 18 and 20, the hot, inert carrier gas, which, in the example under discussion, is helium, is directed into the block through the inlet passageways 64 and, by the valving arrangement therein is then further directed through the cold trap 46. As it passes through the metallic block 10, the helium is retained in its heated condition by virtue of the high temperature of the block attained through the use of the heater rods. The temperature of the block may be controlled as desired.

As the hot carrier gas sweeps through the coil 48 of the cold trap 46, the volatile compounds which have been previously retained therein in the vaporized state are swept out of the cold trap by the carrier gas and pass into the passageways 44 and 66 in the metallic block 10. Here the carrier gas and the entrained volatile compounds are again subjected to the high temperature of the metallic block environment and the volatile compounds are thus prevented from condensing or solidifying as they pass with the helium into the conduit 70 en route to the gas chromatographic column 78.

The chromatographic column 78 is positioned closely adjacent the metallic block 10 so that there is little opportunity for cooling of the carrier gas and its entrained volatile compounds between the time the moving gaseous stream leaves the metallic block 10 and the time it enters the chromatographic column 78. As is well understood in the art, the volatile compounds, which enter the chromatographic column 78 substantially simultaneously, are separated by the column and emerge in a predictable sequence. The compounds then pass consecutively through the conduit 80 to the flame detector 82 where an electrical signal is developed as the compounds are burned in the flame. The electrical signal is transmitted to the recorder 92 which records the electrical signal in the form of peaks on a recorder chart, or as other meaningful indicia, to permit the quality and quantity of the volatile compounds recovered from the solid sample to be known.

The function of the injection port conduit 39 and the self-sealing cap 40 is to permit the operation of the apparatus to be checked by injecting a known sample of liquid or gaseous material into the sample injection passageway 36. This may be accomplished by using a hypodermic syringe, the needle of which is pushed through the self-sealing cap 40 in accordance with sampling techniques well understood in the art.

From the foregoing description of the invention it will be perceived that a novel and improved method is proposed by the present invention for extracting or recovering the volatile compounds from an inert, solid sample, and for transmitting these compounds to appropriate analytical devices for accurate determination of their quality and quantity. The degree to which the volatile compounds entering the gas chromatographic column or other analytical instrument are freed from air is improved through the use of the apparatus, and also, the apparatus assures against the loss through condensation or solidification of minute quantities of such compounds, which loss would otherwise render the analysis inaccurate.

Although a number of modifications and innovations in the described apparatus and steps of the method will occur to those skilled in the art, it is to be borne in mind that the foregoing description of the invention is intended to be exemplary in nature and is not intended to limit the practice of the invention to the specific apparatus and steps hereinbefore described. Therefore, insofar as minor changes in the apparatus and method of the invention do not depart from an employment of the basic principles which underlie the invention, such changes are intended to be encompassed by the spirit and scope of the invention except as the same may be necessarily limited by the language of the accompanying claims or reasonable equivalents thereof.

We claim:

1. Apparatus for extracting entrapped volatile compounds from solid samples, such as well bore cuttings and the like, comprising:
    (a) a metallic block, said block having therein a plurality of sample injection passageways, air evacuation passageways, a pasageway for conducting an inert carrier gas into said block and a passageway for discharging said inert carrier gas from said block;
    (b) means embedded in said block for varying the temperature of said block as desired;
    (c) a sample holding chamber adjacent the block and connected to one of said sample injection passageways;
    (d) a cold trap connected to another of said sample injection passageways and to one of said air evacuation passageways;
    (e) a source of vacuum connected to another of said air evacuation passageways; and
    (f) valve means in said block for applying a vacuum through said cold trap to said sample holding chamber by selective interconnection of said passageways and, alternately, for connecting said cold trap between said passageway for conducting an inert carrier gas into said block and said carrier gas discharge passageway.

2. Apparatus as claimed in claim 1 wherein said valve means comprises a pair of two-position, four-way rotary valves rotatably mounted in said block.

3. Apparatus as claimed in claim 1 wherein said metallic block is aluminum.

4. Apparatus as claimed in claim 1 and further characterized to include a gas chromatographic column connected directly to said inert carrier gas discharge passageway.

5. Apparatus as claimed in claim 1 wherein said means for varying the temperature of said block comprises at least one heater rod projecting into said block; and means connected to said heater rods for varying and controlling the temperature of said rods.

6. Apparatus which comprises:
    (a) a metallic block having therein a first and a second valve bore,
        said block further having formed therein a first sample injection passageway, a second sample injection passageway, a third sample injection passageway, and a second air evacuation passageway, all of the aforesaid passageways communicating between the first valve bore and the exterior of said block,
        said block having in addition a carrier gas inlet passageway, a carrier gas discharge passageway, a first air evacuation passageway, and a passageway leading to said first valve bore all in communication with said second valve bore;
    (b) movable valve means in said first valve bore, said valve means having formed therein a first port arranged to communicate with said second sample injection passageway and said third sample injection passageway at a first position of said valve means, and with said second sample injection passageway at a second position of said valve means,
        said valve means also having formed therein a second port arranged to communicate with said second air evacuation passageway and the passageway communicating between said first and second valve bores at the first position of said valve means, and with said third sample injection passageway and the passageway communicating between said first and second valve bores at the second position of said valve means; and,
    (c) a rotary valve located in said second valve bore, said rotary valve having formed therein a first port arranged to communicate with the passageway communicating between said first and second valve bores and with said first air evacuation passageway at a first position of said rotary valve, and with the passageway between said first and second valve bores and with said carrier gas inlet at a second position of said valve;
        said rotary valve also having formed therein a second port arranged to communicate with said carrier gas inlet and said carrier gas discharge line at the first position of said rotary valve and with said carrier gas discharge line and said first air evacuation passageway at the second position of said rotary valve.

7. The structure defined in claim 6 further including a heater embedded within said metallic block to maintain the temperature of said block at a predetermined level.

8. The apparatus defined in claim 7 further including:
    a sample heater communicating with said second sample injection passageway;
    a vacuum pump communicating with said second air evacuation passageway; and
    a cold trap communicating with said third sample injection passageway and with said first air evacuation passageway.

References Cited by the Examiner

UNITED STATES PATENTS

| 2,287,101 | 6/42 | Horvitz | 73—25 |
| 3,026,712 | 3/62 | Atwood et al. | 73—23 |

OTHER REFERENCES

Merritt et al.: Journal of Agri. Food Chem., vol. 7, No. 11, November 1959, pages 784–787.

Nawar et al.: Analytical Chemistry, vol. 32, No. 11, October 1960, page 1534.

RICHARD C. QUEISSER, *Primary Examiner.*

JOSEPH P. STRIZAK, *Examiner.*